US011578786B2

(12) United States Patent
Kwon

(10) Patent No.: US 11,578,786 B2
(45) Date of Patent: Feb. 14, 2023

(54) POWER TRANSMISSION APPARATUS OF HYBRID ELECTRIC VEHICLE

(71) Applicants: HYUNDAI MOTOR COMPANY, Seoul (KR); KIA CORPORATION, Seoul (KR)

(72) Inventor: Hyukjoon Kwon, Suwon-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/544,918

(22) Filed: Dec. 7, 2021

(65) Prior Publication Data

US 2022/0397184 A1 Dec. 15, 2022

(30) Foreign Application Priority Data

Jun. 15, 2021 (KR) .................. 10-2021-0077654

(51) Int. Cl.
| | |
|---|---|
| *F16H 3/78* | (2006.01) |
| *B60K 6/365* | (2007.10) |
| *F16H 3/70* | (2006.01) |
| *B60K 6/442* | (2007.10) |
| *B60K 6/26* | (2007.10) |

(52) U.S. Cl.
CPC ............ *F16H 3/78* (2013.01); *B60K 6/26* (2013.01); *B60K 6/365* (2013.01); *B60K 6/442* (2013.01); *F16H 3/70* (2013.01)

(58) Field of Classification Search
CPC .......... F16H 3/78; F16H 3/727; F16H 37/065; F16H 37/0806; B60K 6/26; B60K 6/365; B60K 6/442
See application file for complete search history.

(56) References Cited

U.S. PATENT DOCUMENTS 10,343,671 B2 * 7/2019 Byun ................... B60K 6/26

FOREIGN PATENT DOCUMENTS

KR 101734243 B1 5/2017

* cited by examiner

*Primary Examiner* — Huan Le
(74) *Attorney, Agent, or Firm* — McDonnell Boehnen Hulbert & Berghoff LLP

(57) ABSTRACT

A hybrid power transmission apparatus for a vehicle is disclosed. The transmission includes an engine and first and second motor-generators as power sources. The transmission may include: a planetary gear set configured to include a first rotation element that is operatively connected to the first motor-generator, a second rotating element that is operatively connected to the engine and operatively connected to a first intermediate shaft, and a third rotation element to which a second intermediate shaft is operatively connected; a synchronizer configured to optionally operatively connect the second motor-generator to the first intermediate shaft, the second intermediate shaft, or both the first and second intermediate shafts; and an output shaft operatively connected to the second intermediate shaft to output power.

8 Claims, 7 Drawing Sheets

FIG. 3

| Mode | Synchronizer |
|---|---|
| EV | Second synchronizer ring |
| Input Split | Second synchronizer ring |
| Parallel | First and second synchronizer rings |
| Output Split | First synchronizer ring | ance.
POWER TRANSMISSION APPARATUS OF HYBRID ELECTRIC VEHICLE

CROSS-REFERENCE TO RELATED APPLICATION

This application claims priority to and benefits of Korean Patent Application No. 10-2021-0077654, filed in the Korean Intellectual Property Office on Jun. 15, 2021, the entire contents of which are incorporated herein by reference.

BACKGROUND

(a) Field

The present disclosure relates to a hybrid power transmission apparatus for a vehicle, and more particularly, to a hybrid power transmission apparatus for a vehicle, capable of improving fuel efficiency by providing various modes through a synchronizer that can selectively transmit power of a motor-generator to an output or planetary gear set.

(b) Description of the Related Art

Eco-friendly technology is a key technology that depends on survival of future vehicle industry, and advanced vehicle makers are concentrating all their efforts on developing eco-friendly vehicles to achieve environmental and fuel efficiency regulations.

Accordingly, vehicle makers are developing electric vehicles (EV), hybrid electric vehicles (HEV), fuel cell electric vehicles (FCEV), etc. as future vehicles.

Such future vehicles have various limitations such as battery performance, cost, and infrastructure construction. Accordingly, vehicle makers are paying attention to hybrid electric vehicles, which have relatively small restrictions, and are fiercely competing in the development of transmissions to put them into practical use.

A hybrid vehicle is a vehicle using two or more power sources, and the two or more power sources may be combined in various ways. Typically, a hybrid vehicle uses a gasoline engine or diesel engine using conventional fossil fuel and a motor-generator driven by electrical energy as power sources.

The hybrid vehicle seeks enhancement of fuel efficiency by providing various modes that are suitable for various driving situations. A transmission of the hybrid vehicle may implement such various modes by regulating a flow of power from two or more power sources.

The above information disclosed in this Background section is only for enhancement of understanding of the background of the disclosure, and therefore, it may contain information that does not form the prior art that is already known in this country to a person of ordinary skill in the art.

SUMMARY

An embodiment of the present disclosure has been made in an effort to provide a hybrid power transmission apparatus for a vehicle capable of improving fuel efficiency by providing various modes through a synchronizer that can selectively transmit power of a motor-generator to an output or planetary gear set.

In addition, another exemplary embodiment of the present disclosure has been made in an effort to provide a hybrid power transmission apparatus for a vehicle, capable of increasing efficiency of an electric system (battery, motor, etc.) during high-speed driving and controlling an engine operating point by providing an output split mode.

An exemplary embodiment of the present disclosure provides a hybrid power transmission apparatus for a vehicle, including: an engine; and first and second motor-generators as power sources. The hybrid power transmission apparatus may include a planetary gear set configured to include a first rotation element that is operatively connected to the first motor-generator, a second rotating element that is operatively connected to the engine and operatively connected to a first intermediate shaft, and a third rotation element to which a second intermediate shaft is operatively connected, a synchronizer configured to optionally operatively connect the second motor-generator to the first intermediate shaft, the second intermediate shaft, or both the first and second intermediate shafts, and an output shaft operatively connected to the second intermediate shaft to output power.

The planetary gear set may be a single pinion planetary gear set, the first rotation element may be a sun gear, the second rotation element may be a planet carrier, and the third rotation element may be a ring gear.

The synchronizer may include a hub shaft operationally connected to the second motor-generator, a hub fixedly mounted on the hub shaft, a first synchronizer ring rotatably positioned on the hub shaft on a first side of the hub and operatively connected to the first intermediate shaft; a second synchronizer ring rotatably positioned on the hub shaft on a second side of the hub and operatively connected to the second intermediate shaft; and a sleeve that can translate in the axial direction on an outer circumferential surface of the hub and/or the first and second synchronizer rings to selectively connect the hub to the first synchronizer ring, the second synchronizer ring, or both the first and second synchronizer rings.

A first intermediate gear may be fixedly mounted on the first intermediate shaft, and a second intermediate gear may be fixedly mounted on the second intermediate shaft.

The synchronizer may further include the first synchronizer gear directly connected to the first synchronizer ring and engaged with the first intermediate gear, and the second synchronizer gear directly connected to the second synchronizer ring and engaged with the second intermediate gear.

A third intermediate gear may be further fixedly mounted on the second intermediate shaft, and an output gear may be fixedly mounted to the output shaft to be engaged with the third intermediate gear.

The sleeve may operatively connect the hub and the second synchronizer ring and the engine may be stopped in an electric vehicle mode, the sleeve may operatively connect the hub and the second synchronizer ring, power of the engine may be split in the planetary gear set and transferred to the first motor-generator and the output shaft, and power of the second motor-generator may be transmitted to the output shaft without passing through the planetary gear set in an input split mode, the sleeve may operatively connect the hub and both the first and second synchronizer rings, some of the power of the second motor-generator may be transferred to the output shaft through the planetary gear set, and the other of the power of the second motor-generator may be transferred to the output shaft without passing through the planetary gear set in a parallel mode, and the sleeve may operatively connect the hub and the first synchronizer ring, some of the power of the second motor-generator may be transferred to the planetary gear set and combined with the power of the engine, the other of the power of the second motor-generator may be transferred to the output shaft without passing through the planetary gear set, and the power of the engine combined with some of the power of the second motor-generator may be split in the planetary gear set and transferred to the first motor-generator and the output shaft in an output split mode.

Another exemplary embodiment of the present disclosure provides a hybrid power transmission apparatus for a vehicle, including an engine configured to serve as a power source, first and second motor-generators configured to serve as power sources, a planetary gear set configured to include a sun gear connected to the first motor-generator, a planet carrier connected to the engine, and a ring gear, a first intermediate shaft fixedly connected to the planetary carrier and including a first intermediate gear, a second intermediate shaft connected to the ring gear and fixedly including second and third intermediate gears, a synchronizer configured to optionally operatively connect the second motor-generator to the first intermediate shaft, the second intermediate shaft, or both the first and second intermediate shafts, and an output shaft configured to fixedly include an output gear that is engaged with the third intermediate gear.

The synchronizer may include a hub shaft operationally connected to the second motor-generator, a hub fixedly mounted on the hub shaft, a first synchronizer ring rotatably positioned on the hub shaft on a first side of the hub and operatively connected to the first intermediate shaft, a second synchronizer ring rotatably positioned on the hub shaft on a second side of the hub and operatively connected to the second intermediate shaft, and a sleeve axially movably positioned on an outer circumferential surface of the hub and/or the first and second synchronizer rings to selectively connect the hub to the first synchronizer ring, the second synchronizer ring, or both the first and second synchronizer rings.

The synchronizer may further include the first synchronizer gear directly connected to the first synchronizer ring and engaged with the first intermediate gear, and the second synchronizer gear directly connected to the second synchronizer ring and engaged with the second intermediate gear.

The sleeve may operatively connect the hub and the second synchronizer ring, the engine may be stopped in an electric vehicle mode, the sleeve may operatively connect the hub and the second synchronizer ring, power of the engine may be split in the planetary gear set and transferred to the first motor-generator and the output shaft, and power of the second motor-generator may be transmitted to the output shaft without passing through the planetary gear set in an input split mode, the sleeve may operatively connect the hub and both the first and second synchronizer rings, some of the power of the second motor-generator may be transferred to the output shaft through the planetary gear set, and the other of the power of the second motor-generator may be transferred to the output shaft without passing through the planetary gear set in a parallel mode, the sleeve may operatively connect the hub and the first synchronizer ring, some of the power of the second motor-generator may be transferred to the planetary gear set and combined with the power of the engine, the other of the power of the second motor-generator may be transferred to the output shaft without passing through the planetary gear set, and the power of the engine combined with some of the power of the second motor-generator may be split in the planetary gear set and transferred to the first motor-generator and the output shaft in an output split mode.

According to an embodiment of the present disclosure, the parallel mode and the output split mode may be additionally implemented through the synchronizer that can selectively transfer the power of the motor-generator to the output gear and the planetary gear set. Driving performance and fuel economy performance can be improved by providing various modes suitable for various driving situations of a hybrid vehicle.

According to another embodiment of the present disclosure, it is possible to increase efficiency of the electric system (a battery, a motor, etc.) during high-speed driving and to control an engine operating point by providing the output split mode. In addition, since a maximum torque of the first motor-generator may be reduced, packaging of the first motor-generator can be improved and a material cost can be reduced.

According to another embodiment of the present disclosure, since friction elements are not used, the configuration of the hydraulic circuit is simplified. Accordingly, the packaging of the transmission can be improved and the material cost can be reduced.

Further, effects that can be obtained or expected from embodiments of the present disclosure are directly or suggestively described in the following detailed description. That is, various effects expected from embodiments of the present disclosure will be described in the following detailed description.

BRIEF DESCRIPTION OF THE DRAWINGS

Embodiments herein may be better understood by reference to the following description in connection with the accompanying drawings in which like reference numerals refer to identical or functionally similar elements.

FIG. 3 illustrates an operation table of a synchronizer in various modes according to an embodiment of the present disclosure.

Figure 1:
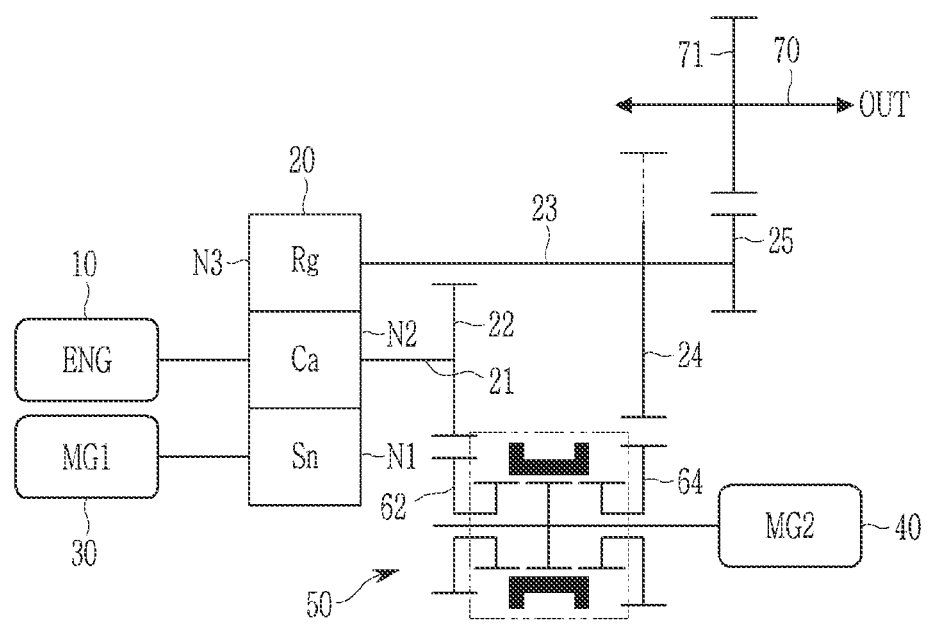
FIG. 1 illustrates a schematic diagram of a hybrid power transmission apparatus for a vehicle according to an embodiment of the present disclosure.

It is to be understood that the drawings referenced above are not necessarily drawn to scale, but rather present a somewhat simplified representation of various preferred features illustrating the basic principles of the present disclosure. Certain design features of the present disclosure, including, e.g., particular dimensions, orientations, positions, and shapes will be determined in part by the particular intended application and usage environment.

DETAILED DESCRIPTION

The terminologies used herein are for the purpose of describing particular embodiments only, and is not intended to limit the present disclosure. As used herein, singular forms are intended to also include plural forms, unless the context clearly indicates otherwise. The terms "comprise" and/or "comprising," when used herein, specify the recited features, integers, steps, acts, elements and/or presence of components, but it will also be understood that this does not exclude the presence or addition of one or more of other features, integers, steps, acts, elements, components, and/or groups thereof. As used herein, the term "and/or" includes any one or all combinations of the associated listed items.

As used herein, it is understood that terms such as "vehicle" or "of a vehicle" or other similar terms include passenger vehicles, buses, trucks, various commercial vehicles, and sports utility vehicles (SUVs) as well as rail vehicles. In addition, the vehicle may include a hybrid vehicle.

As used herein, a "hybrid vehicle" or similar term refers to a vehicle driven by two or more power sources, and the two or more power sources may include, but are not limited to, an engine and an electric motor.

As used herein, "operably connected" or similar terms indicate that at least two members are directly or indirectly connected to each other. Two members operationally connected do not always rotate at a same speed and in a same direction, and when one member is operationally connected to rotate, the other member operationally connected also rotates. Unless the context explicitly indicates otherwise, two members that are connected indicates that the two members are operatively connected.

Directly connected or similar terms indicates that at least two members are always operatively connected.

In addition, selectively connected or similar terms indicates that at least two members are operatively connected or not connected to each other through actuation of a coupling element (e.g., a synchronizer, a dog clutch, a clutch, a brake, etc.). That is, when the coupling element selectively connects two members, the two members are operatively connected when the coupling element operates, but when the coupling element is released, the two members are not connected.

Accordingly, it will be understood by a person of ordinary skill in the art that selective connection or similar terms is different from operative connection or similar terms and direct connection or similar terms.

Embodiments of the present disclosure will now be described in detail with reference to the accompanying drawings.

Figure 2:
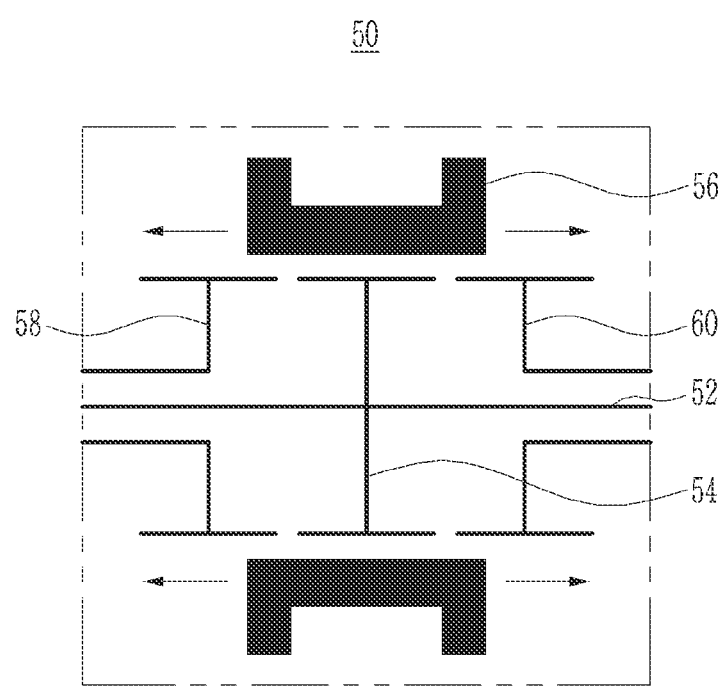
FIG. 2 illustrates an enlarged view of a synchronizer of FIG. 1.

FIG. 1 illustrates a schematic diagram of a hybrid power transmission apparatus for a vehicle according to an embodiment of the present disclosure, and FIG. 2 illustrates an enlarged view of a synchronizer of FIG. 1.

As illustrated in FIG. 1, a hybrid power transmission apparatus for a vehicle according to an embodiment of the present disclosure includes an engine 10 and first and second motor-generators 30 and 40 as power sources.

The engine 10 is one of the power sources, and may comprise various known engines such as a gasoline engine or a diesel engine using an existing fossil fuel.

The first and second motor-generators 30 and 40 perform motor and generator functions, as known to a person of ordinary skill in the art. The first and second motor-generators 30 and 40 each include a stator fixed to a transmission housing, and a rotatable rotor that is positioned radially inside the stator.

The hybrid power transmission apparatus according to an embodiment of the present disclosure includes a planetary gear set 20 that converts or divides and outputs power of the engine 10 and/or the first and second motor-generators 30 and 40, and an output shaft 70 that finally outputs the power output from the planetary gear set 20.

The planetary gear set 20 may be formed as a single pinion planetary gear set, which include a sun gear Sn, a planetary carrier Ca rotatably supporting a plurality of pinion gears that are engaged with the sun gear Sn from a radially outer side of the sun gear Sn, and a ring gear Rg engaged with the pinion gears from a radially outer side of the pinion gears, as first, second, and third rotation elements N1, N2, and N3.

In one example, the first rotating element N1 is the sun gear Sn, which is operatively connected to the first motor-generator 30 to receive power from the first motor-generator 30 or to transfer power to the first motor-generator 30. When power is transferred to the first motor-generator 30, the first motor-generator operates as a generator.

The second rotating element N2 is the planetary carrier Ca, which is operatively connected to the engine 10 to receive power from the engine 10. In addition, the second rotation element N2 is operatively connected to a first intermediate shaft 21 to receive power from the first intermediate shaft 21 or to transmit power to the first intermediate shaft 21.

The third rotation element N3 is the ring gear Rg, which is operatively connected to a second intermediate shaft 23 to transmit power of the ring gear Rg to the second intermediate shaft 23.

A first intermediate gear 22 is fixedly mounted on the first intermediate shaft 21, and second and third intermediate gears 24 and 25 are fixedly mounted on the second intermediate shaft 23. The third intermediate gear 25 is engaged with an output gear 71 fixedly mounted on an output shaft 70, and finally outputs power transmitted to the second intermediate shaft 23 through the output shaft 70.

The hybrid power transmission apparatus according to an embodiment of the present disclosure further includes a synchronizer 50 that is selectively connected to at least one of the first and the intermediate shafts 21 and 23 of the second motor-generator 40.

The synchronizer 50 may selectively transmit the power of the second motor-generator 40 to the planetary gear set 20 or selectively transmit the power of the planetary gear set 20 to the second motor-generator 40 by selectively connecting the second motor-generator 40 to the planetary gear set 20 through the first intermediate shaft 21.

The synchronizer 50 may selectively output the power of the second motor-generator 40 through the output shaft 70 by selectively connecting the second motor-generator 40 to the output shaft 70 or the output gear 71 through the second intermediate shaft 21.

In addition, the synchronizer 50 may selectively transmit the power of the second motor-generator 40 to the planetary gear set 20 or the power of the planetary gear set 20 to the second motor-generator 40, and at the same time, may selectively output the power of the second motor-generator 40 through the output shaft 70 by selectively connecting the second motor-generator 40 to both the first and second intermediate shafts 21 and 23.

For this purpose, as illustrated in FIG. 1 and FIG. 2, the synchronizer 50 may include a hub shaft 52, a hub 54, first and second synchronizer rings 58 and 60, first and second synchronizer gears 62 and 64, and a sleeve 56.

The hub shaft 52 may be operatively connected to the second motor-generator 40 to transfer to or receive power from the second motor-generator 40. The hub 54 is fixedly mounted on the hub shaft 52, the first synchronizer ring 58 and the first synchronizer gear 62 are rotatably positioned on the hub shaft 52 on a first side of the hub 54, and the second synchronizer ring 60 and the second synchronizer gear 64 are rotatably positioned on the hub shaft 52 on a second side of the hub 54. Outer circumferential surfaces of the hub 54 and the first and second synchronizer rings 58 and 60 are positioned on a same peripheral surface, and outer circumferential teeth are formed on each of the outer circumferential surfaces.

The sleeve 56 is axially movably positioned on the outer circumferential surfaces of the hub 54 and/or the first and second synchronizer rings 58 and 60. Inner circumferential teeth capable of being engaged with the outer circumferential teeth of the hub 54 and the first and second synchronizer rings 58 and 60 may be formed on an inner circumferential surface of the sleeve 56 to enable the sleeve 56 to axially move and to be operatively connected to the first synchronizer ring 58, the second synchronizer ring 60, or both the first and second synchronizer rings 58 and 60.

The first synchronizer gear 62 is directly connected to the first synchronizer ring 58, and is engaged with the first intermediate gear 22 on the first intermediate shaft 21. When the sleeve 56 operatively connects the hub 54 and the first synchronizer ring 58, the second motor-generator 40 and the planetary gear set 20 may transmit or receive power to or from each other.

The second synchronizer gear 64 is directly connected to the second synchronizer ring 60, and is engaged with the second intermediate gear 24 on the second intermediate shaft 23. When the sleeve 56 operatively connects the hub 54 and the second synchronizer ring 60, the power of the second motor-generator 40 is output through the output shaft 70.

FIG. 3 illustrates an operation table of a synchronizer in various modes according to an embodiment of the present disclosure.

As illustrated in FIG. 3, a hybrid power transmission apparatus for a vehicle according to an embodiment of the present disclosure may implement an electric vehicle (EV) mode, an input split mode, a parallel mode, and an output split mode.

In the EV mode and the input split mode, the hub 54 of the synchronizer 50 is operatively connected to the second synchronizer ring 60, in the parallel mode, the hub 54 of synchronizer 50 is operatively connected to both the first and second synchronizers 58 and 60, and in the output split mode, the hub 54 of the synchronizer 50 is operatively connected to the first synchronizer ring 58.

Hereinafter, a flow of power in each mode will be described in detail with reference to FIG. 4 to FIG. 7.

Figure 4:
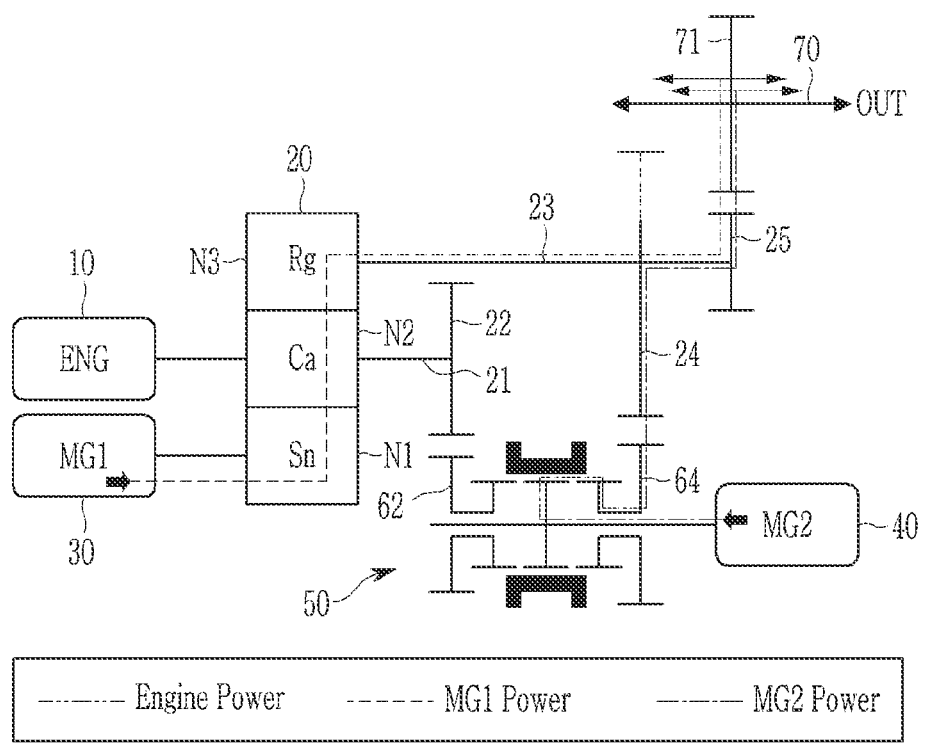
FIG. 4 illustrates a flow of power in a hybrid power transmission apparatus for a vehicle in an electric vehicle mode according to an embodiment of the present disclosure.
Figure 5:
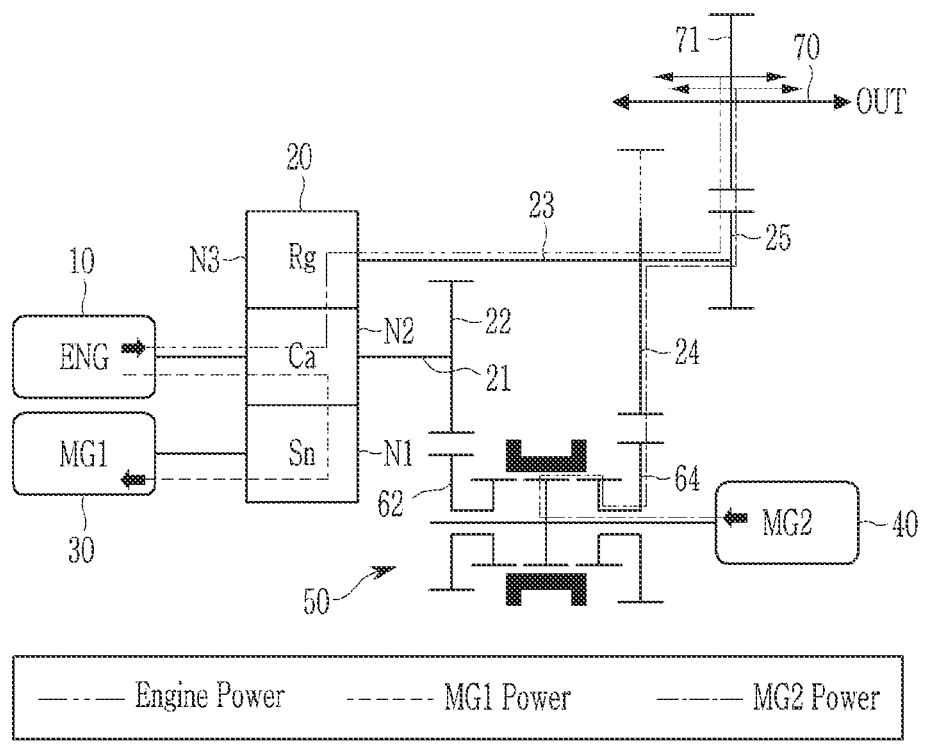
FIG. 5 illustrates a flow of power in a hybrid power transmission apparatus for a vehicle in an input split mode according to an embodiment of the present disclosure.
Figure 6:
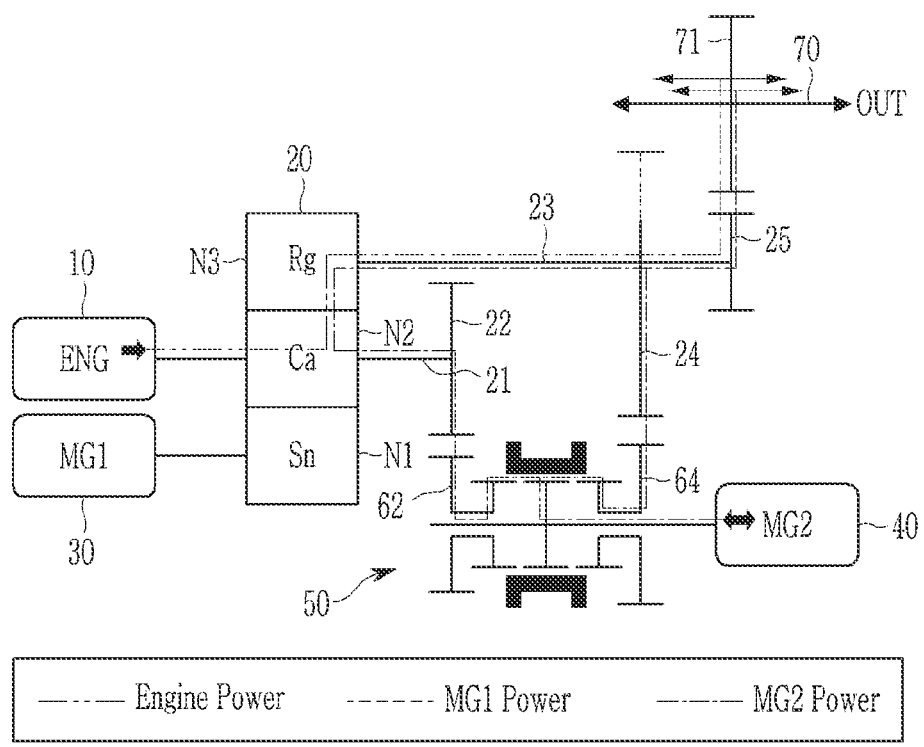
FIG. 6 illustrates a flow of power in a hybrid power transmission apparatus for a vehicle in a parallel mode according to an embodiment of the present disclosure.
Figure 7:
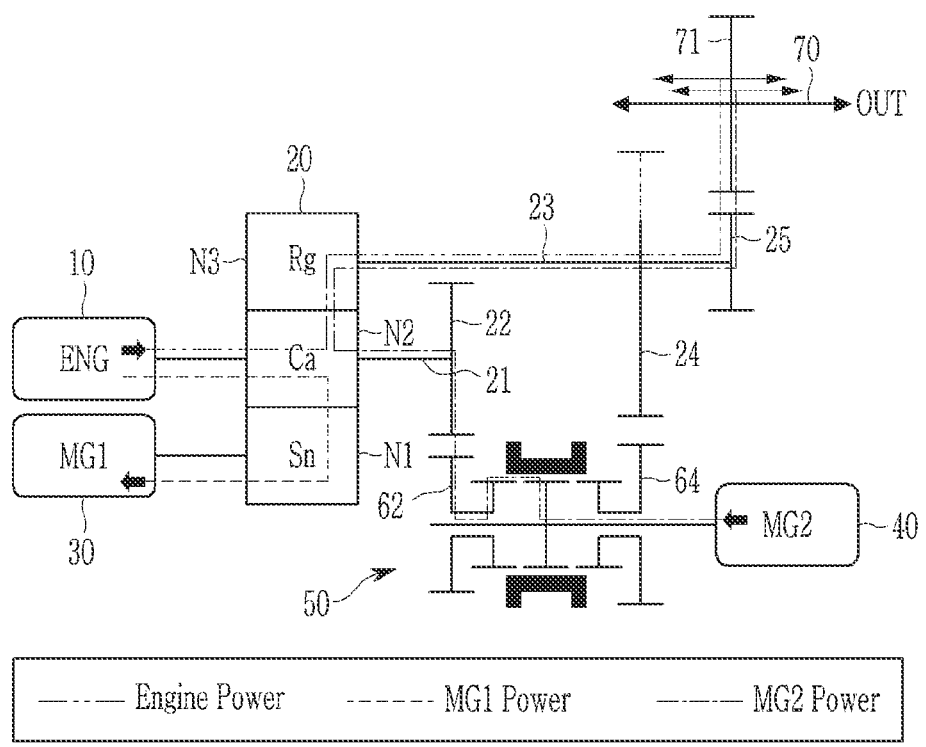
FIG. 7 illustrates a flow of power in a hybrid power transmission apparatus for a vehicle in an output split mode according to an embodiment of the present disclosure.

FIG. 4 illustrates a flow of power in a hybrid power transmission apparatus for a vehicle in an electric vehicle mode according to an embodiment of the present disclosure, FIG. 5 illustrates a flow of power in a hybrid power transmission apparatus for a vehicle in an input split mode according to an embodiment of the present disclosure, FIG. 6 illustrates a flow of power in a hybrid power transmission apparatus for a vehicle in a parallel mode according to an embodiment of the present disclosure, and FIG. 7 illustrates a flow of power in a hybrid power transmission apparatus for a vehicle in an output split mode according to an embodiment of the present disclosure.

To implement a compact transmission, the engine 10 and the first motor-generator 30 are positioned on a first side of the planetary gear set 20, and the synchronizer 50 and the second motor-generator 40 are positioned on a second side of the planetary gear set 20.

Electric Vehicle (EV) Mode

As illustrated in FIG. 3 and FIG. 4, in the electric vehicle mode, the engine 10 is stopped, and the hub 54 of the synchronizer 50 is operatively connected to the second synchronizer ring 60.

Accordingly, the power of the second motor-generator 40 is sequentially output through the hub shaft 52, the hub 54, the sleeve 56, the second synchronizer ring 60, the second synchronizer gear 64, the second intermediate gear 24, the second intermediate shaft 23, the third intermediate gear 25, the output gear 71, and the output shaft 70.

In addition, the third rotation element N3 rotates through the second intermediate shaft 23 to which the power of the second motor/generator 40 is transferred, and the second rotation element N2 operatively connected to the engine 10 is stopped, and thus the first motor-generator 30 operates such that the first rotation element N1 rotates depending on a gear ratio of the planetary gear set 20. Accordingly, the electric vehicle mode may be implemented by controlling the rotation speed of the engine 10 to be 0 through the first motor-generator 30.

Further, the power of the first motor/generator 30 may be sequentially output through the planetary gear set 20, the second intermediate shaft 23, the third intermediate gear 25, the output gear 71, and the output shaft 70.

Input Split Mode

In the input split mode, the engine 10 operates, and the hub 54 of the synchronizer 50 is operatively connected to the second synchronizer ring 60.

Accordingly, the power of the second motor-generator 40 is sequentially output through the hub shaft 52, the hub 54, the sleeve 56, the second synchronizer ring 60, the second synchronizer gear 64, the second intermediate gear 24, the second intermediate shaft 23, the third intermediate gear 25, the output gear 71, and the output shaft 70.

In addition, the power of the engine 10 is input to the second rotation element N2 to be divided, and some of the power of the engine 10 is supplied to the first motor-generator 30 through the first rotation element N1. In this case, the first motor-generator 30 operates as a generator.

In addition, the other of the power of the engine 10 may be sequentially output through the planetary gear set 20, the second intermediate shaft 23, the third intermediate gear 25, the output gear 71, and the output shaft 70.

The input split mode is mainly used when the vehicle is traveling at a low speed. In the input split mode, the vehicle travels with the power of the engine 10 and the second motor-generator 40, and some of the power of the engine 10 is supplied to the first motor-generator 30 to enable the first motor-generator 30 to generate power.

Parallel Mode

In the parallel mode, the engine 10 operates, the first motor-generator 30 is stopped, and the hub 54 of the synchronizer 50 is operatively connected to both the first and second synchronizer rings 58 and 60.

Accordingly, the power of the second motor-generator 40 is input to the sleeve 56 through the hub shaft 52 and the hub 54, and is transferred to the first and second synchronizer rings 58 and 60. Some of the power of the second motor-generator 40 transferred to the second synchronizer ring 60 is sequentially output through the hub shaft 52, the hub 54, the sleeve 40, the second synchronizer ring 60, the second synchronizer gear 64, the second intermediate gear 24, the second intermediate shaft 23, the third intermediate gear 25, the output gear 71, and the output shaft 70. The other of the power of the second motor-generator 40 transferred to the first synchronizer ring 58 is input to the second rotation element N2.

In addition, the power of the engine 10 is also input to the second rotation element N2 to be combined with the other of the power of the second motor-generator 40. Power combined in the second rotation element N2 may be sequentially output through the planetary gear set 20, the second intermediate shaft 23, the third intermediate gear 25, the output gear 71, and the output shaft 70.

Output Split Mode

In the output split mode, the engine 10 operates, and the hub 54 of the synchronizer 50 is operatively connected to the first synchronizer ring 58.

The power of the second motor-generator 40 is sequentially input to the second rotation element N2 through the hub shaft 52, the hub 54, the first synchronizer ring 58, the first synchronizer gear 62, the first intermediate gear 22, and the first intermediate shaft 21.

In addition, the power of the engine 10 is also input to the second rotation element N2 to be combined with the power of the second motor-generator 40. Some of power combined in the second rotation element N2 is supplied to the first motor-generator 30 through the first rotation element N1. In this case, the first motor-generator 30 operates as a generator.

The other of the power combined in the second rotation element N2 may be sequentially output through the planetary gear set 20, the second intermediate shaft 23, the third intermediate gear 25, the output gear 71, and the output shaft 70.

The output split mode is mainly used when the vehicle is traveling at a high speed. In the output split mode, the vehicle travels with the power of the engine 10 and the second motor-generator 40, and some of the power of the engine 10 and the second motor-generator 40 is supplied to the first motor-generator 30 to enable the first motor-generator 30 to generate power.

According to an embodiment of the present disclosure, the parallel mode and the output split mode may be additionally implemented through the synchronizer 50 that can selectively transfer the power of the second motor-generator 40 to the output gear 71 and the planetary gear set 20. Driving performance and fuel economy performance can be improved by providing various modes suitable for various driving situations.

In addition, it is possible to increase efficiency of the electric system (a battery, a motor-generator, etc.) during high-speed driving and to control an engine operating point by providing the output split mode. In addition, since a maximum torque of the first motor-generator 30 may be reduced, packaging of the first motor-generator 30 can be improved and a material cost can be reduced.

Further, since a synchronizer is used instead of a friction element to implement a mode, a configuration of a hydraulic circuit is simplified. Accordingly, the packaging of the transmission can be improved and the material cost can be reduced.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A hybrid power transmission apparatus for a vehicle, including an engine and first and second motor-generators as power sources, the apparatus comprising:
    a planetary gear set configured to include a first rotation element that is operatively connected to the first motor-generator, a second rotating element that is operatively connected to the engine and operatively connected to a first intermediate shaft, and a third rotation element to which a second intermediate shaft is operatively connected;
    a first intermediate gear fixedly mounted on the first intermediate shaft;
    a second intermediate gear fixedly mounted on the second intermediate shaft;
    a synchronizer configured to selectively operatively connect the second motor-generator to the first intermediate shaft, the second intermediate shaft, or both the first and second intermediate shafts; and
    an output shaft operatively connected to the second intermediate shaft to output power,
    wherein the synchronizer includes:
    a hub shaft operationally connected to the second motor-generator;
    a hub fixedly mounted on the hub shaft;
    a first synchronizer ring rotatably positioned on the hub shaft on a first side of the hub and operatively connected to the first intermediate shaft;
    a second synchronizer ring rotatably positioned on the hub shaft on a second side of the hub and operatively connected to the second intermediate shaft;
    a sleeve axially movably positioned on one or both of an outer circumferential surface of the hub and the first and second synchronizer rings to selectively connect the hub to the first synchronizer ring, the second synchronizer ring, or both the first and second synchronizer rings
    a first synchronizer gear directly connected to the first synchronizer ring and engaged with the first intermediate gear; and
    a second synchronizer gear directly connected to the second synchronizer ring and engaged with the second intermediate gear.

2. The hybrid power transmission apparatus of claim 1, wherein
    the planetary gear set is a single pinion planetary gear set,
    the first rotation element is a sun gear, the second rotation element is a planet carrier, and the third rotation element is a ring gear.

3. The hybrid power transmission apparatus of claim 1, wherein
    a third intermediate gear is further fixedly mounted on the second intermediate shaft, and
    an output gear is fixedly mounted to the output shaft to be engaged with the third intermediate gear.

4. The hybrid power transmission apparatus of claim 1, wherein the sleeve operatively connects the hub and the second synchronizer ring and the engine is stopped in an electric vehicle mode,
    when the sleeve operatively connects the hub and the second synchronizer ring, power of the engine is split in the planetary gear set and transferred to the first motor-generator and the output shaft, and power of the second motor-generator is transmitted to the output shaft without passing through the planetary gear set in an input split mode, when the sleeve operatively connects the hub and both the first and second synchronizer rings, a first portion of power of the power of the second motor-generator is transferred to the output shaft through the planetary gear set, and a second portion of the power of the second motor-generator is transferred to the output shaft without passing through the planetary gear set in a parallel mode, and when the sleeve operatively connects the hub and the first synchronizer ring, the first portion of power of the second motor-generator is transferred to the planetary gear set and combined with the power of the engine, the second portion of the power of the second motor-generator is transferred to the output shaft without passing through the planetary gear set, and the power of the engine combined with the first portion of power is split in the planetary gear set and transferred to the first motor-generator and the output shaft in an output split mode.

5. A hybrid power transmission apparatus for a vehicle, comprising:
an engine configured to serve as a power source;
first and second motor-generator configured to serve as power sources;
a planetary gear set configured to include a sun gear connected to the first motor-generator, a planet carrier connected to the engine, and a ring gear;
a first intermediate shaft fixedly connected to the planetary carrier and including a first intermediate gear;
a second intermediate shaft fixedly connected to the ring gear and including second and third intermediate gears;
a synchronizer configured to optionally operatively connect the second motor-generator to the first intermediate shaft, the second intermediate shaft, or both the first and second intermediate shafts; and
an output shaft configured to fixedly include an output gear that is engaged with the third intermediate gear.

6. The hybrid power transmission apparatus of claim 5, wherein
the synchronizer includes:
a hub shaft operationally connected to the second motor-generator;
a hub fixedly mounted on the hub shaft;
a first synchronizer ring rotatably positioned on the hub shaft on a first side of the hub and operatively connected to the first intermediate shaft;

a second synchronizer ring rotatably positioned on the hub shaft on a second side of the hub and operatively connected to the second intermediate shaft; and
a sleeve axially movably positioned on one or both of an outer circumferential surface of the hub and the first and second synchronizer rings to selectively connect the hub to the first synchronizer ring, the second synchronizer ring, or both the first and second synchronizer rings.

7. The hybrid power transmission apparatus of claim 6, wherein the synchronizer includes:
a first synchronizer gear directly connected to the first synchronizer ring and engaged with the first intermediate gear; and
a second synchronizer gear directly connected to the second synchronizer ring and engaged with the second intermediate gear.

8. The hybrid power transmission apparatus of claim 6, wherein
the sleeve operatively connects the hub and the second synchronizer ring, the engine is stopped in an electric vehicle mode,
the sleeve operatively connects the hub and the second synchronizer ring, power of the engine is split in the planetary gear set and transferred to the first motor-generator and the output shaft, and power of the second motor-generator is transmitted to the output shaft without passing through the planetary gear set in an input split mode,
the sleeve operatively connects the hub and both the first and second synchronizer rings, a portion of the power of the second motor-generator is transferred to the output shaft through the planetary gear set, and another portion of the power of the second motor-generator is transferred to the output shaft without passing through the planetary gear set in a parallel mode, and
the sleeve operatively connects the hub and the first synchronizer ring, some of the power of the second motor-generator is transferred to the planetary gear set and combined with the power of the engine, the other of the power of the second motor-generator is transferred to the output shaft without passing through the planetary gear set, and the power of the engine combined with some of the power of the second motor-generator is split in the planetary gear set and transferred to the first motor-generator and the output shaft in an output split mode.

\* \* \* \* \*